No. 752,754. PATENTED FEB. 23, 1904.
P. C. BRENNAN.
PORTABLE SAND DRIER.
APPLICATION FILED SEPT. 15, 1902.
NO MODEL. 4 SHEETS—SHEET 1.
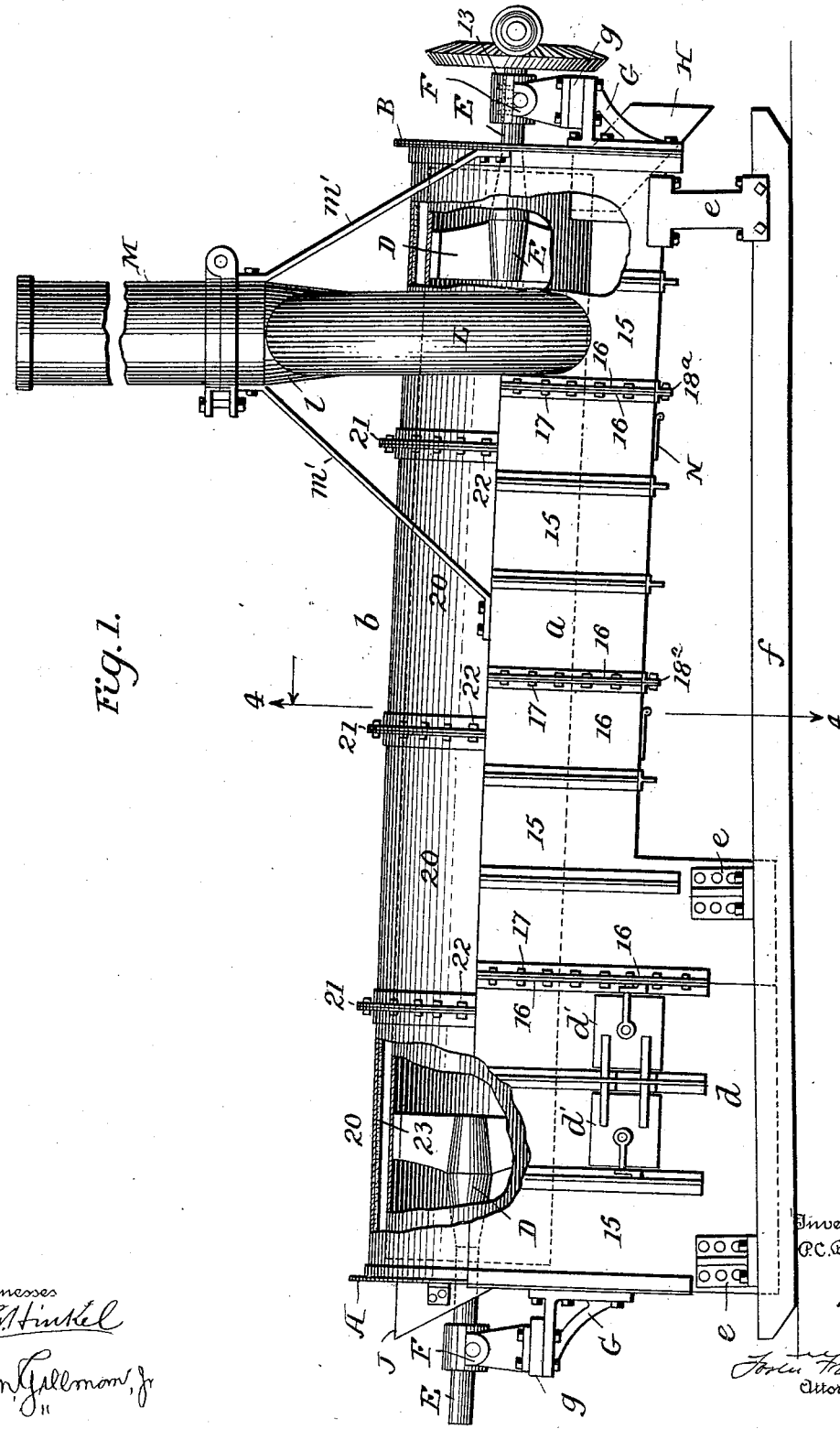

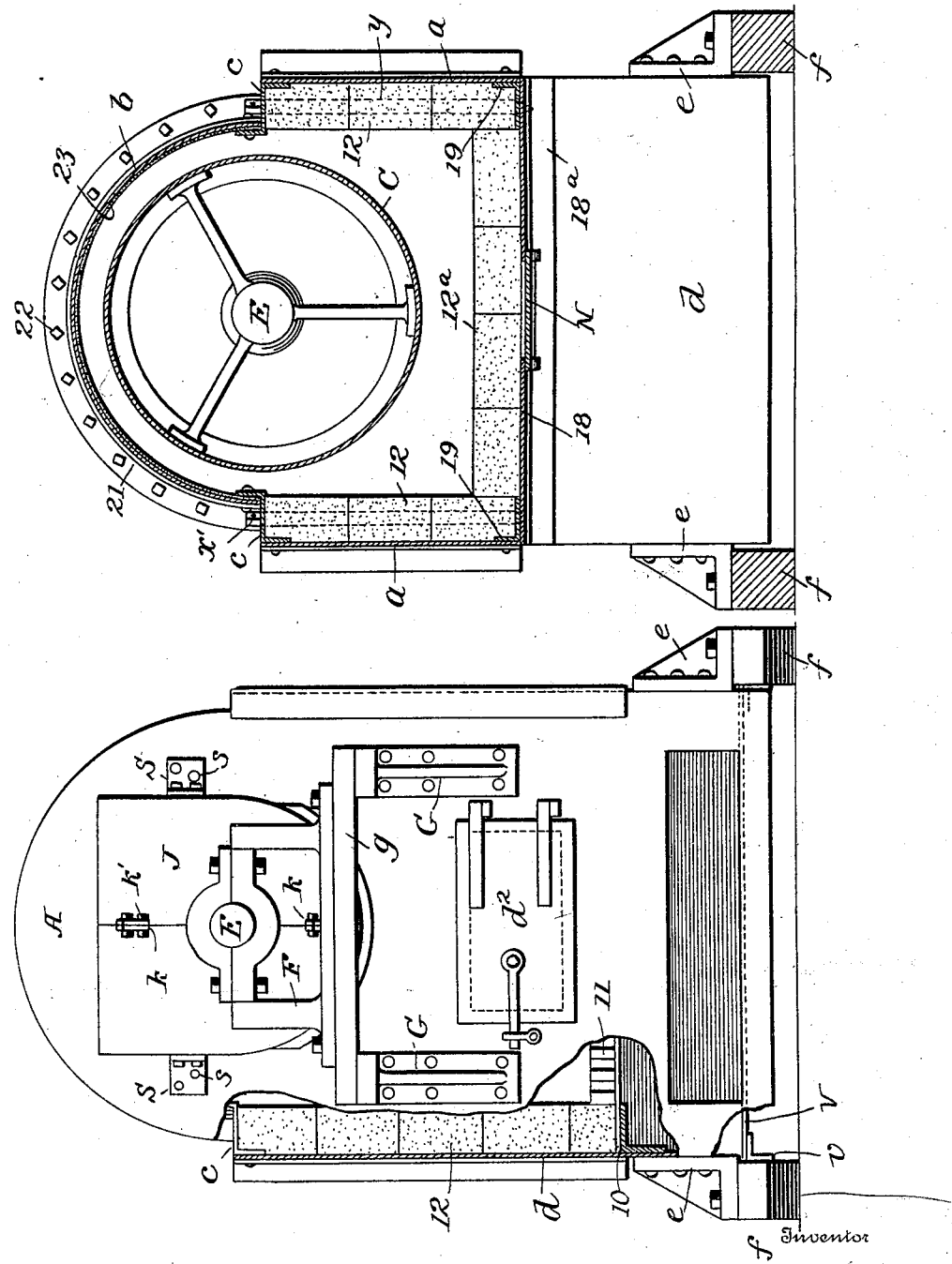

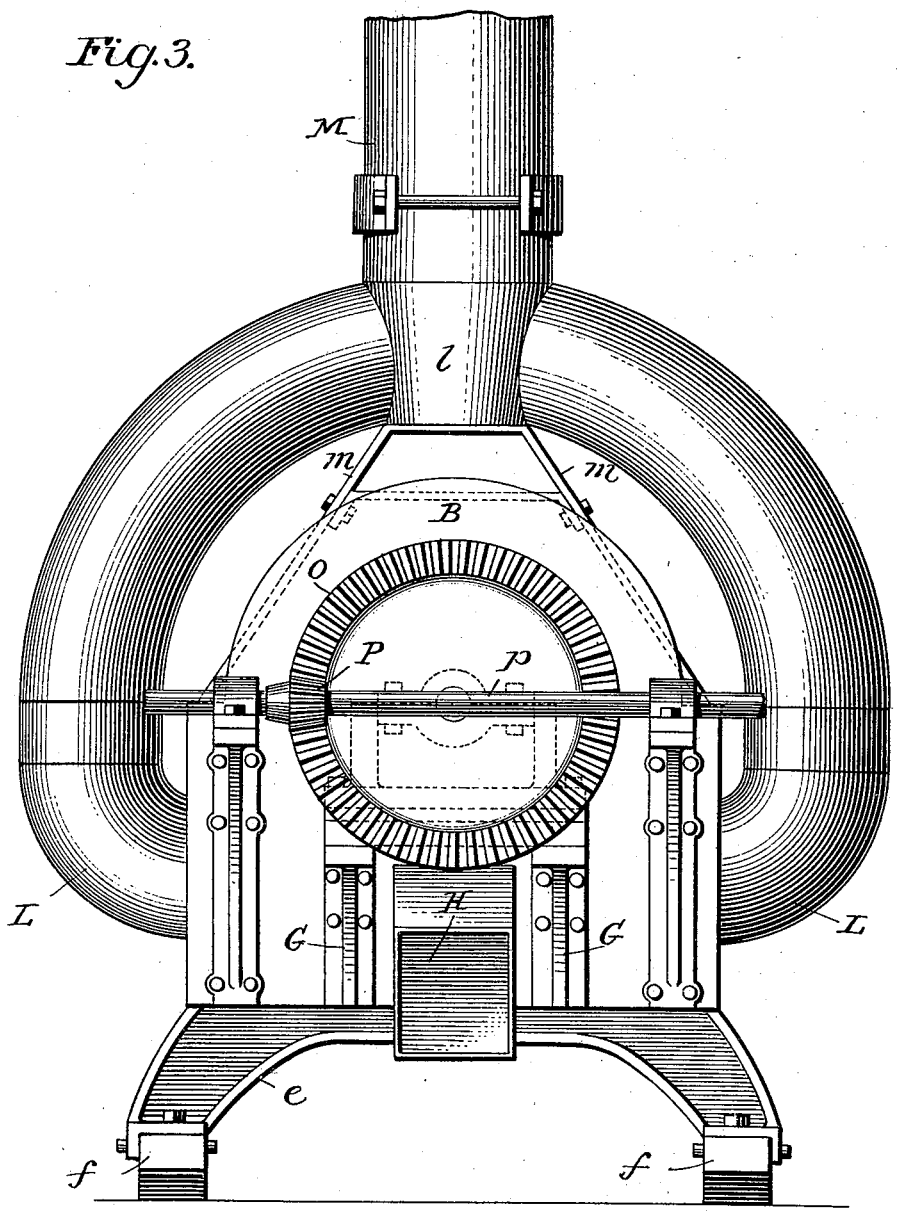

No. 752,754. PATENTED FEB. 23, 1904.
P. C. BRENNAN.
PORTABLE SAND DRIER.
APPLICATION FILED SEPT. 15, 1902.
NO MODEL. 4 SHEETS—SHEET 4.
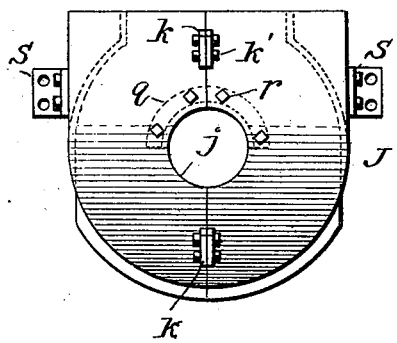
Fig. 5.
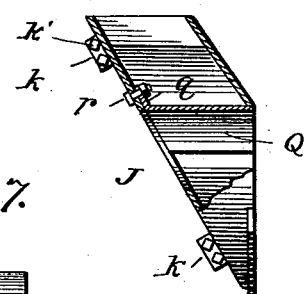
Fig. 6.
Fig. 7.
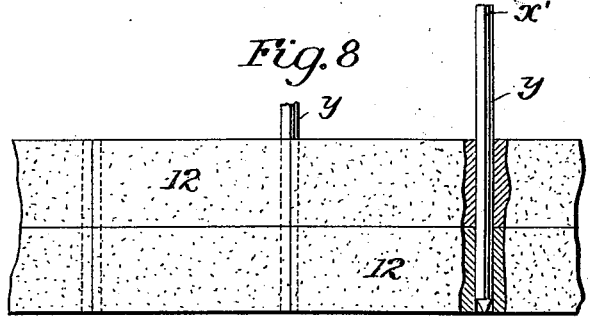
Fig. 8.
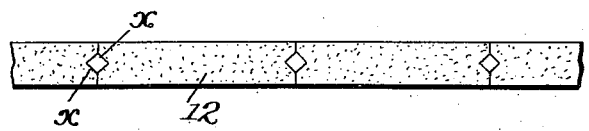
Fig. 9.
Witnesses
Inventor
Paul C. Brennan
By
Attorneys No. 752,754. Patented February 23, 1904.

UNITED STATES PATENT OFFICE.

PAUL CARRINGTON BRENNAN, OF LONG ISLAND CITY, NEW YORK.

PORTABLE SAND-DRIER.

SPECIFICATION forming part of Letters Patent No. 752,754, dated February 23, 1904.

Application filed September 15, 1902. Serial No. 123,485. (No model.)

*To all whom it may concern:*

Be it known that I, PAUL CARRINGTON BRENNAN, a citizen of the United States, residing at New York, Long Island City, in the county of Queens and State of New York, have invented certain new and useful Improvements in Portable Sand-Driers, of which the following is a specification.

This invention relates to knockdown portable sand-driers; and one object of the invention is to provide a device of this character made up of sections detachably connected together, so that the several sections may be easily connected or disconnected.

In the asphalt-paving business what is known as the "railroad plant" has been in quite general use in laying pavements in the smaller cities where the business did not warrant the erection of a permanent plant. These railroad plants are, however, expensive and frequently cannot be made available, owing to the lack of trackage at the place where the work is to be done, it being necessary to occupy a considerable extent of track for a considerable period. A cheaper portable plant and one which does not require the use of a railway-track during its operation has therefore become a necessity.

The sand-drier forming the subject-matter of this invention is intended particularly to form a part of such plant, and I have so designed it that it can be "knocked down" and packed in a small space for transportation either in a railroad-car or in a wagon or other vehicle which can be hauled over an ordinary road.

Another object of the invention is to provide a considerable amount of space for the products of combustion below the sand-drum and to insure that a large proportion of such products pass below the drum on their way to the smoke-stack.

Other objects of the invention will appear in the following specification, in which the invention will be fully described and its advantages pointed out.

In the accompanying drawings, Figure 1 is an elevation, partly in section and partly broken away, of a sand-drier constructed in accordance with my invention. Figs. 2 and 3 are end elevations. Fig. 4 is a vertical transverse section on the line 4 4 of Fig. 1. Figs. 5 and 6 are views of the sectional feed-hopper for the sand detached. Fig. 7 is a view of a flanged half-sleeve detached. Fig. 8 is a detail view of the fire-bricks employed for lining the casing. Fig. 9 is a view of a removable retaining-rod for the fire-bricks.

The outer casing consists of the rectangular lower portion $a$ and the curved hood or cover $b$, joined together by means of Z-bars $c$, one on each side, to which they are bolted. The casing projects downward for a portion of its length to form a fire-box $d$, which preferably is provided with doors $d'$ on one or both sides in addition to the usual door $d^2$ in the end.

The casing is supported by a series of saddles $e$, preferably made of cast-iron, which are bolted or otherwise secured to a pair of skids $f$, and the saddles are so arranged that the casing will be supported at an inclination sufficient to cause the sand to flow by gravity from the receiving to the discharge end. Preferably there will be a saddle at each end of the fire-box, and angle-bars 10 will be attached to the saddles and form supports for the grate-bars 11 and the fire-brick lining 12.

As shown, the vertical sides of the casing are made up of a series of sections 15, each section or plate having an angle-iron 16 secured to each end, and the sections are secured together end to end by bolts 17 passing through the contiguous flanges formed by the angle-irons. In advance of the fire-box the casing is reduced in depth and the bottom of the casing is made in sections 18 and connected to the vertical sides by angle-bars 19. These bottom plates also have angle-irons $18^a$ secured to them, which are also bolted together the same as those on the vertical plates. The hood or cover $b$ is also made up of a series of arched sections 20, each having an angle-iron 21 at each end, the sections being connected by bolts 22 extending through the angle-irons. Each section of the hood is provided with a sheet-asbestos lining, (indicated by 23.)

The end plates or heads of the casing (indicated, respectively, by A and B) are bolted to the angle-irons on the end sections.

The vertical walls of the casing are lined, preferably from end to end, with fire-bricks 12, fitting in offset portions of the walls, the upper edges of which constitute bearings for the lower edges of the hoods, which are thus supported by the lining of bricks, and the abutting ends of the bricks are provided with a groove $x$, preferably V-shaped, so that when the bricks are in place there will be a square hole formed for the passage of a square rod $y$ at each joint. The rods are preferably pointed at their lower end and provided with a hole $x'$ at their upper end, and they pass through openings in the horizontal portion of the Z-bar $c$ and enter openings in the angle-bars upon which the fire-bricks are supported. The upper ends of the rods will project above the Z-bar $c$, and by inserting a hook into the hole $x'$ and pulling on it each rod can easily be removed. The rods when in position will securely hold the bricks in place; but by withdrawing the rods the bricks can be readily removed. Obviously the grooves $x$ could be of any other preferred shape and the rods be correspondingly shaped. The bottom of the casing may also be covered with fire-brick $12^a$ or with any other protective material.

The sand-drum is indicated by C and may be made up of sections, if preferred. It is supported concentric with the hood $b$. Near each end a spider D is firmly secured to the interior surface of the drum, preferably by riveting, and from each spider a trunnion E extends outwardly beyond the adjacent end of the drum and through the adjacent end of the casing, and these trunnions form journals for the drum, which are supported in boxes having trunnions rocking in sockets of bearings F. The trunnion at the front or discharge end of the apparatus is provided with thrust-rings 13, preferably integral with it, which fit a closed box and take all the thrust of the drum. The other trunnion is turned smooth and can move endwise through its box, thus permitting expansion or contraction of the drum without straining the bearings. As the box receiving the rings incloses the latter, the oil is preserved on the bearing and dust excluded.

It is essential that the bearings be at some distance from the casing in order not to become unduly heated, and for this purpose I provide brackets G, which are bolted to the ends of the casing, and on these brackets filler-plates $g$ are supported, and these in turn support the bearings F, which are, as shown, some distance from the casing. The advantage of using the filler-plates $g$ is that the bearings can be removed without disturbing the driving-gear or changing the elevation of the drum-axis, and this is particularly true of the bearing at the front end. To remove a bearing, the trunnion must be blocked up to take the weight off the bearing, remove the bolts which hold the filler-plate and bearing in place, and then slip the filler-plate out endwise or sidewise, and if the cap of the bearing be removed the bearing will drop down and can be removed from the trunnion. In driers of this character it is necessary to repair the bearings frequently, and hence it is important that they may be removed without disturbing other parts of the drier.

Some means must be provided for introducing the sand into the drum and discharging it therefrom, and for the latter purpose a spout H is provided, which extends through the front end plate of the casing below the drum and into which the drum discharges the dried sand.

At the receiving end of the drum I employ a sectional hopper J, which is opposite an opening in the end of the casing and projects into the drum. Each section of the hopper is provided with a semicircular recess $j$ to fit over the trunnion. Each section is also provided with a pair of ears $k$, which are perforated for the passage of bolts $k'$, which secure the two sections together. I also employ a half-sleeve Q, which rests upon the trunnion and is provided at one end with a flange $q$, extending at an angle to the half-sleeve substantially the same as the angle of inclination of the back of the hopper to the trunnion, and the flange is bolted to the back of the hopper by bolts $r$, the nuts of which are preferably outside the hopper. Each section of the hopper is provided on its side with a lug S, adapted when the hopper is in position to lie against the end plate of the casing, and bolts $s$, extending through the end plate and the lugs, serve to secure the hopper firmly in position.

By first removing the bolts $r$ the half-sleeve can be lifted out of the hopper, and then by removing the bolts $s$ and the bolts $k'$ the sections can be removed from around the trunnion without moving the bearing F. The opening through which the hopper extends will when the hopper is removed serve as an entrance to the drum, which is sometimes necessary to effect repairs or for other purposes.

It is desirable that the products of combustion which pass from the fire-box around the drum and naturally rise to the top of the casing shall be compelled to move downwardly before they can escape to the smoke-stack in order to more fully utilize the heat thereof than is possible when they escape directly from the upper part of the casing. This may be accomplished in various ways; but for the purpose of my invention it is necessary that the outlet for the products of combustion be below the axis of the drum and, preferably, at or near the bottom of the casing. As shown, I provide two outlet-pipes L, which lead from the sides of the casing close to the bottom thereof and near the front end of the casing. These pipes communicate with a box or chamber $l$, to the top of which the smoke-stack M is hinged. The box is supported by a series of bars (indicated by $m$ and $m'$) which are connected to the casing. By this arrangement the products of combustion are more or less retained below the drum and the entire surface of the latter is subjected to a substantially uniform heat. Another advantage is that dust and cinders cannot so easily escape from the smoke-stack as when the latter leads from the top of the casing. Obviously only one pipe L could be employed, and the pipe or pipes could lead out from the end or the bottom of the casing, and hence I do not limit myself to the structure illustrated.

The rectangular shape of the lower part of the casing is also of great advantage, as it affords ample space for the products of combustion below the drum. Heretofore, so far as I am aware, in driers of this character the outer casing has been cylindrical and the drum has been concentric with it. There was consequently no more space below the drum than there was above it, and the space below would very soon become filled with dust, &c., from the fire, and so prevent any heat from coming into contact with the lower portion of the drum. Some dust will of course accumulate on the bottom of the casing, and in order to remove it I provide cleaning-doors (indicated by N) through which the dust may be removed by a tool or be blown out by a steam-jet.

In order to rotate the drum, the trunnion E at the front of the casing projects beyond its bearing and is provided with a bevel-gear O, with which a bevel-pinion P on a transverse shaft $p$ meshes. The shaft $p$ may be supported in any suitable manner and be driven from any source of power, and I do not deem it necessary to illustrate these features, as they form no part of the invention.

If desired, angle-bars $v$ may be secured to the inner sides of the skids below the fire-box to support an iron plate V to catch the ashes which fall through the grate-bars.

From the foregoing description it will be readily seen that the various sections of the casing can be easily connected or disconnected and that the fire-brick lining can easily be put in position or removed. The pipes L also being jointed can be easily removed, as can the smoke stack and box, and it is obvious that all the parts entering into the structure of the drier when separated can be packed into a comparatively small space for transportation.

Without limiting myself to the precise details of construction illustrated and described, I claim—

1. In a sand-drier, the combination of the inclosing metallic casing, a sand-drum, journals secured to the drum and extending through the ends of the casing, brackets secured to and supported by the ends of the casing, filler-plates on the brackets, bearings for the journals supported on the filler-plates, and means for detachably securing the bearings and filler-plates to the brackets, substantially as set forth.

2. In a sand-drier, an outer casing having a fire-box, a sand-drum supported within the casing, and an exit at each side for the products of combustion leading from the casing below the axis of the drum, substantially as set forth.

3. In a sand-drier, an inclosing metallic casing having a rectangular lower portion and a curved hood or cover, a fire-chamber at one end of the rectangular part of the casing, a drum supported within the casing concentric with the hood, and a pipe at each side of and leading from said rectangular portion of the casing, at a point remote from the fire-box and below the axis of the drum and communicating with a smoke-stack above the casing, substantially as set forth.

4. In a sand-drier, the combination of an outer casing, a sand-drum supported within it in parallel relation thereto, a pair of skids, one at each side, parallel saddles secured to the skids and supporting the casing, substantially as set forth.

5. In a sand-drier, the combination of the outer casing having an opening at one end, a sand-drum within the casing, a feed-hopper for the sand opposite said opening and made in sections detachably connected together, and a trunnion on the drum extending between said sections, substantially as described.

In testimony whereof I have signed my name to this specification in the presence of two subscribing witnesses.

PAUL CARRINGTON BRENNAN.

Witnesses:
FRANK SEAMANS,
A. G. SIDMAN.